W. W. NEIGHBOUR.
WHEEL.
APPLICATION FILED DEC. 19, 1907.
968,392.
Patented Aug. 23, 1910.
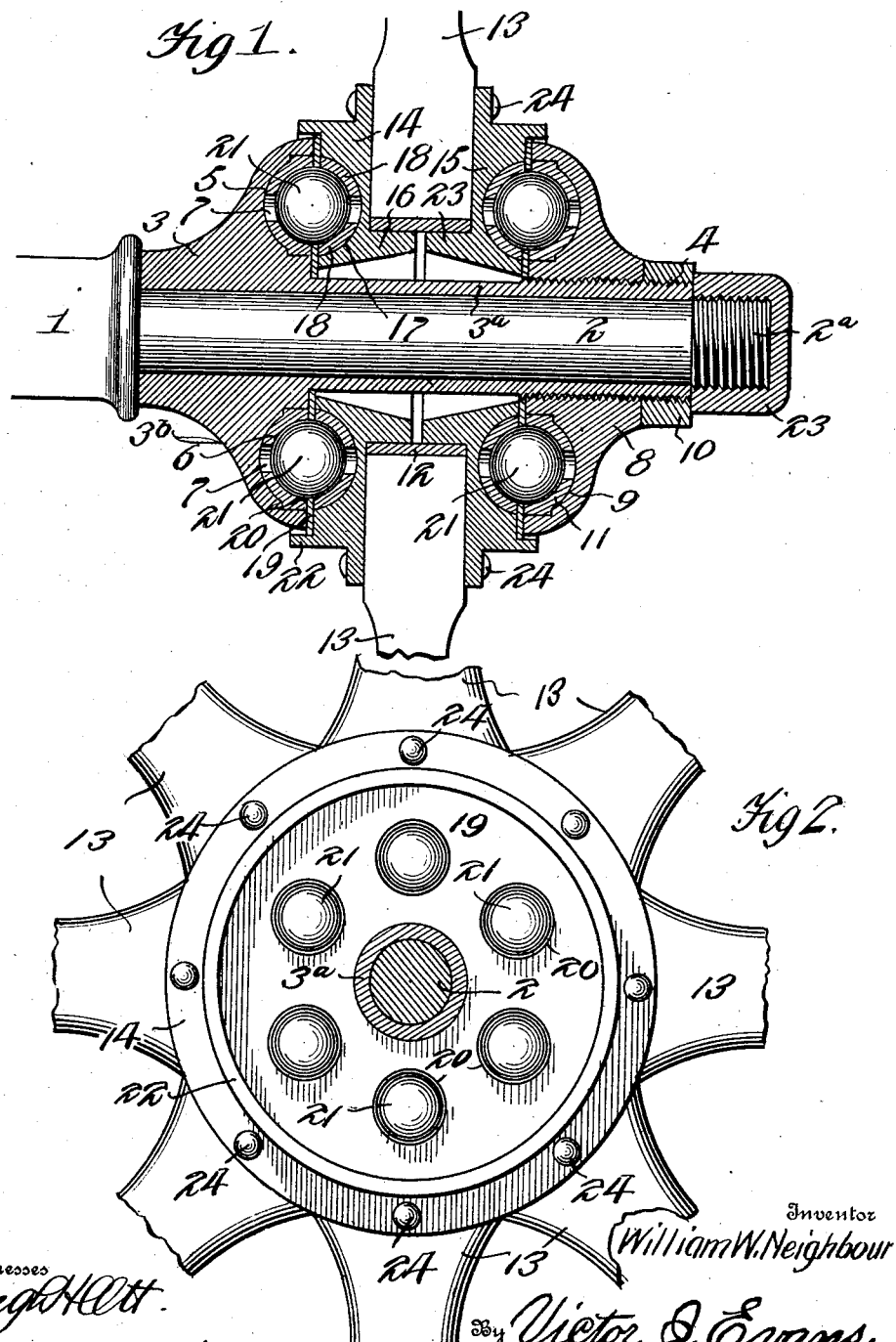
Witnesses
Inventor
William W. Neighbour
By Victor J. Evans
Attorney

UNITED STATES PATENT OFFICE.

WILLIAM W. NEIGHBOUR, OF DENISON, TEXAS, ASSIGNOR TO SUSPENSION BALL BEARING MANUFACTURING COMPANY, OF NEW YORK, N. Y.

WHEEL.

968,392.  Specification of Letters Patent.  Patented Aug. 23, 1910.

Application filed December 19, 1907. Serial No. 407,206.

*To all whom it may concern:*

Be it known that I, WILLIAM W. NEIGHBOUR, a citizen of the United States of America, residing at Denison, in the county of Grayson and State of Texas, have invented new and useful Improvements in Wheels, of which the following is a specification.

This invention relates to wheels, and more particularly to the construction of hub, and has for an object to provide a wheel in which the hub is mounted upon the axle of a vehicle to freely rotate thereon.

A still further object of my invention is to provide a wheel in which the hub thereof is provided with anti-friction bodies mounted in removable runway forming elements.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views:—Figure 1 is a longitudinal section through a portion of the vehicle wheel showing the hub construction. Fig. 2 is a detail side elevation of the hub portion of a wheel, with parts removed to more clearly disclose my invention.

Referring now more particularly to the drawing, there is shown an axle 1 provided with a spindle 2 preferably of ordinary construction provided at its outer end with an exteriorly threaded portion 2ª. The spindle 2 has mounted thereon a sleeve 3 provided with an outwardly extending tubular portion 3ª which extends approximately the entire length of the spindle, and as illustrated, the said tubular portion is provided with a series of exterior threads 4. The sleeve 3 is provided with an annular enlargement 3ᵇ in which is formed an annular groove 5 preferably of semi-cylindrical form. The groove 5 has removably mounted therein a correspondingly formed member 6 provided with slots or apertures 7 for a lubricating material, (not shown). The threaded portion 4 of the tubular portion 3ª receives an interiorly threaded sleeve 8 identical in construction with the enlargement 3ᵇ of the sleeve 3 and, as shown, has its annular groove 9 disposed in horizontal alinement with the groove 5 formed in the sleeve 3.

A threaded collar 10 is engaged with the threaded end 4 of the tubular portion 3ª, and as shown, the portion 2ª of the spindle has engaged therewith a cap nut 23 arranged to hold the collar 10 in its adjusted position. The annular groove 9 formed in the sleeve 8 has removably mounted therein a semi-cylindrical member 11 identical with the member 6 previously described.

A band or collar 12 is shown at the inner ends of the spokes 13, and at the sides of the said spokes, clamps 14 and 15 are provided. The clamp 14 is provided with an annular flange 16 which extends partly within the band or collar 12, and the said clamp has formed therein an annular groove 17 for receiving a semi-cylindrical member 18 arranged to act in conjunction with the member 6 to form therewith a runway. A packing and spacing disk 19 is disposed between the member 3 and the clamp 14 and it is provided with a series of spaced passages 20 adapted to hold the spherical anti-friction bodies 21 in proper spaced relation with respect to each other in the runway formed by the members 6 and 18. The clamp 14 has formed integral therewith an annular flange 22 which surrounds a portion of the sleeve 3 to effectively prevent the entrance of dust between the said sleeve and the clamp 14 and to obviate the accumulation of foreign matter in the runway.

The clamp 15 is identical in construction with the clamp 14 and is provided with an inwardly extending annular flange 23 disposed partly within the collar or band 12. The remaining parts of the clamp 15 being identical in construction with the previously described clamp 14 need not be further described, but it is obvious that this clamp acts in conjunction with the sleeve 8 which is threaded upon the portion 3ª of the sleeve 3. The clamps 14 and 15 are preferably secured to the spokes 13 by means of rivets 24 but it will of course be understood that any other suitable fastening device may be employed.

I claim:—

A wheel comprising spaced sleeves, one of the said sleeves being provided with a tubular extension which is threaded to the other sleeve to permit adjustment of the same longitudinally of the said tubular extension, clamps disposed between the said sleeve and supported thereby, a band surrounding portions of the said clamps, members mounted in the outer faces of the said clamps, members mounted upon the inner faces of the said sleeves and arranged immediately opposite the first named members, apertured disks disposed between the opposing members of the clamps and sleeves respectively, antifriction bodies mounted in the apertures in said disks and operatively associated with the said clamps and sleeves respectively, a spindle extending through the said tubular extension, and a threaded clamping collar mounted upon the said tubular extension and adapted for frictional engagement against one of the said sleeves.

In testimony whereof I affix my signature in presence of two witnesses.

WILLIAM W. NEIGHBOUR.

Witnesses:
ANDREW J. KINCAID,
MICHAEL O. SHARP.